(12) United States Patent
Erbe et al.

(10) Patent No.: US 11,585,574 B2
(45) Date of Patent: Feb. 21, 2023

(54) HEATING DEVICE AND METHOD FOR OPERATING A HEATING DEVICE

(71) Applicant: E.G.O. Elektro-Geraetebau GmbH, Oberderdingen (DE)

(72) Inventors: Sebastian Erbe, Bretten (DE); Ralf Pawlowitsch, Karlsruhe (DE); Konrad Schoenemann, Sulzfeld (DE); Elisabeth Stoetzner, Bretten (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 783 days.

(21) Appl. No.: 16/541,246

(22) Filed: Aug. 15, 2019

(65) Prior Publication Data
US 2020/0056811 A1     Feb. 20, 2020

(30) Foreign Application Priority Data
Aug. 17, 2018   (DE) .................... 10 2018 213 869.9

(51) Int. Cl.
*F24H 9/20*     (2022.01)
*F24H 1/20*     (2022.01)
(Continued)

(52) U.S. Cl.
CPC ........... *F24H 9/2021* (2013.01); *F24H 1/202* (2013.01); *F24H 9/45* (2022.01); *G01F 23/246* (2013.01); *H05B 1/0297* (2013.01)

(58) Field of Classification Search
CPC .............................. F24H 9/2021; F24H 1/202
See application file for complete search history.

(56) References Cited

U.S. PATENT DOCUMENTS 5,825,136 A * 10/1998 Rudolph ............ H05B 41/2855
                                                    315/307
6,084,216 A *  7/2000 Slegt ..................... G05D 23/1909
                                                    219/442
(Continued)

FOREIGN PATENT DOCUMENTS

CN      2056983 U      5/1990
CN      1937860 A      3/2007
(Continued)

OTHER PUBLICATIONS

EP3278691A1—machine translation (Year: 2018).*
(Continued)

*Primary Examiner* — Nathaniel Herzfeld
(74) *Attorney, Agent, or Firm* — Alston & Bird LLP

(57) ABSTRACT

In a method for operating a heating device, fluid is initially introduced into a fluid chamber, then the heating elements of the heating device are switched on and a leakage current is detected as a temperature-dependent current flow through a dielectric insulation layer. A supply voltage of the heating devices is measured and is taken into account in an evaluation of the temperature at the fluid chamber as a function of the leakage current. The leakage current is converted into a leakage voltage by means of a resistor, which is then divided by the measured supply voltage. Subsequently, the quotient obtained may be multiplied by a compensation value in order to obtain a normalized leakage signal, which is normalized to a base value of the supply voltage. The normalized leakage signal is used, if a particular absolute value of the leakage signal is exceeded or if a particular slope of the profile of the leakage signal is exceeded, in order to top up the fluid chamber with more fluid and/or to reduce the heating power of at least one heating element.

22 Claims, 4 Drawing Sheets

(51) Int. Cl.
    *G01F 23/24*     (2006.01)
    *H05B 1/02*     (2006.01)
    *F24H 9/45*     (2022.01)

(56) References Cited

U.S. PATENT DOCUMENTS

| | | | | |
|---|---|---|---|---|
| 6,393,213 | B1 * | 5/2002 | Bresolin | H05B 3/80 |
| | | | | 219/538 |
| 2003/0146204 | A1 | 8/2003 | Kaastra | |
| 2007/0068913 | A1 | 3/2007 | Zeyen et al. | |
| 2007/0125764 | A1 | 6/2007 | Knoeppel et al. | |
| 2008/0073336 | A1 | 3/2008 | Bohlender et al. | |
| 2009/0014433 | A1 | 1/2009 | O'Neil et al. | |
| 2009/0107988 | A1 | 4/2009 | Kaastra | |
| 2014/0029928 | A1 * | 1/2014 | Koebrich | F24H 1/162 |
| | | | | 392/479 |
| 2014/0216077 | A1 * | 8/2014 | Albert | F25B 30/02 |
| | | | | 62/238.7 |
| 2014/0312028 | A1 | 10/2014 | Tiwana | |
| 2016/0341419 | A1 | 11/2016 | Fluhrer | |
| 2017/0086257 | A1 * | 3/2017 | Muehlnikel | F24H 1/102 |

FOREIGN PATENT DOCUMENTS

| | | |
|---|---|---|
| CN | 1991272 A | 7/2007 |
| CN | 200950672 Y | 9/2007 |
| CN | 101061076 A | 10/2007 |
| CN | 101576430 A | 11/2009 |
| CN | 102160456 A | 8/2011 |
| CN | 105229883 A | 1/2016 |
| CN | 106993995 A | 8/2017 |
| DE | 10-2013-200277 A1 | 1/2014 |
| EP | 3096585 A1 | 11/2016 |
| EP | 3145273 A1 | 3/2017 |
| EP | 3197241 A1 | 7/2017 |
| EP | 3278691 A1 | 2/2018 |
| EP | 3278691 A1 * | 2/2018 .............. A21B 3/04 |
| JP | 2004-281121 A | 10/2004 |
| JP | 2012-178365 A | 9/2012 |
| WO | WO 2007/136268 A1 | 11/2007 |
| WO | WO-2010/008279 | 1/2010 |
| WO | WO 2010/008279 A1 | 1/2010 |

OTHER PUBLICATIONS

China National Intellectual Property Administration, Office Action, including Search Report, received for Application No. 201910763938.1, dated Jan. 29, 2022, 12 pages, People's Republic of China.

German Patent and Trademark Office, German Search Report for Application No. 10-2018-213869.9, dated Jul. 3, 2019, (7 pages), Munchen Germany.

European Search Report for European Patent Application No. 19188759.5, dated Jan. 29, 2020, (8 pages), European Patent Office, Munchen, Germany.

\* cited by examiner

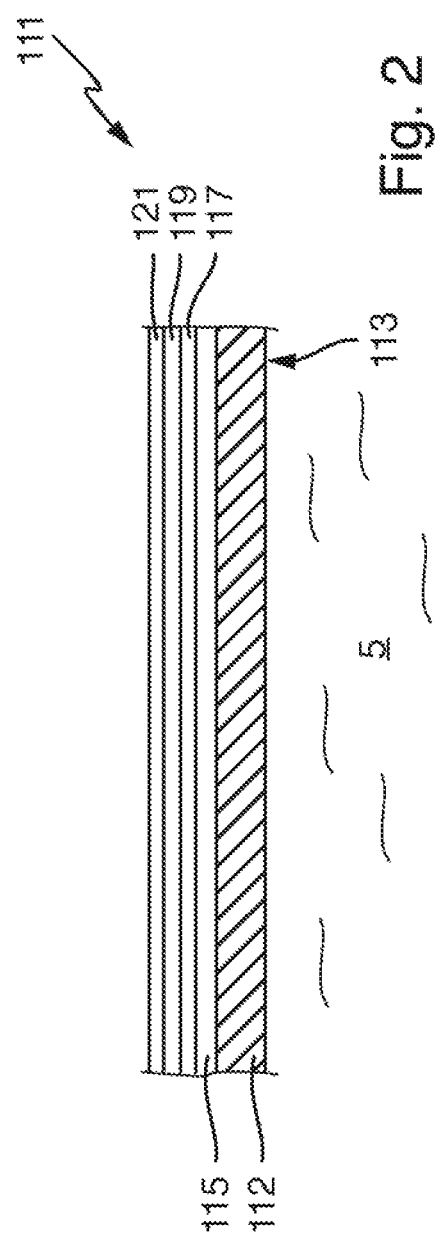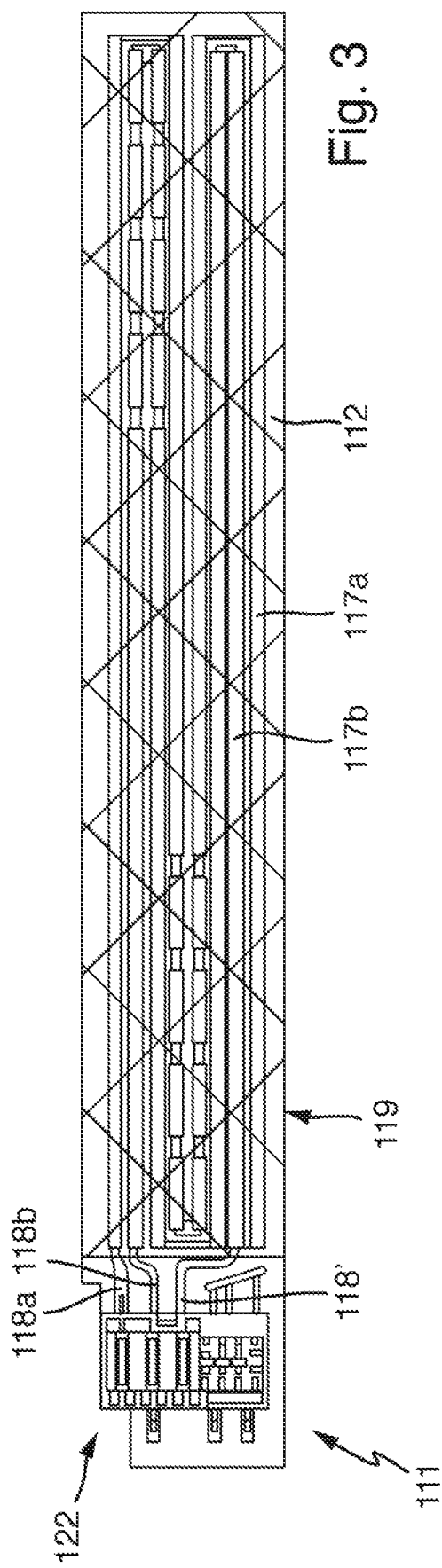

HEATING DEVICE AND METHOD FOR OPERATING A HEATING DEVICE

CROSS-REFERENCE TO RELATED APPLICATIONS

This application claims priority to German Application No. 10 2018 213 869.9, filed Aug. 17, 2018, the contents of which are hereby incorporated herein in its entirety by reference.

BACKGROUND

The invention relates to a heating device for fluids, in particular for liquids such as water, and to a method for operating such a heating device, particularly in relation to a temperature detection or detection of temperature-dependent processes.

Heating devices of the species are known in principle from DE 102013200277 A1, US 2016/0341419 A1 and US 2017/0086257 A1. They comprise a heating element having at least one heating conductor, the heating element being covered by an extensive dielectric insulation layer. This insulation layer has a temperature-dependent electrical resistance, so that a so-called leakage current or ground current or fault current can thereby be detected and can be used as a measure of a temperature at the heating device. Thus, both transient processes such as local overheating, for example due to calcification at a position, and larger-area short-term overheating due to an insufficient water level may be ascertained. Situation-dependent response thereto may then be carried out.

BRIEF SUMMARY

The object of the invention is to provide a heating device as mentioned in the introduction and a method for the operation thereof, with which problems of the prior art can be solved and, in particular, it is possible to be able to operate the heating device even more accurately and even more safely.

This object is achieved by a heating device having the features of claim 1 and by a method having the features of claim 16. Advantageous and preferred configurations of the invention are the subject-matter of the other claims and will be explained in more detail below. In this case many of the features are described only for the heating device or only for the method for the operation thereof. Regardless of this, they are however intended to be applicable separately and independently of one another both for the heating device and for the method for the operation thereof. The wording of the claims is included in the content of the description by explicit reference.

Provision is made that the heating device comprises a fluid chamber. The latter may be configured in different ways, and may be configured as a kind of fluid store, or as an alternative essentially for a fluid, which is intended to be heated, to flow through, for example as a channel or a tube. On an outer side of the fluid chamber, advantageously facing away from the fluid, at least one heating element having at least one heating conductor is applied. The heating element may be configured in a wide variety of ways, and may for example also comprise a plurality of heating conductors connected in parallel and/or series, as is known per se. The heating element may be used to heat fluid, for example water, in the fluid chamber in order to evaporate it.

The heating device comprises at least one extensive dielectric insulation layer. The latter essentially covers the at least one heating element, or covers a correspondingly large area. The insulation layer may be applied directly on the heating element, although further layers may also be placed between them. Furthermore, the dielectric insulation layer has a temperature-dependent electrical resistance. At least one electrically conductive connection is respectively provided on both sides of the insulation layer. This connection may for example be the heating element or one of its heating conductors, or possibly also a metallic outer side of the fluid chamber itself, which is advantageously also a carrier for the heating element. At least one of the electrically conductive connections may be extensive, advantageously with approximately the same area as the insulation layer. In particular, the two electrically conductive connections on the two sides of the insulation layer are over a large area, or cover or overlap the insulation layer.

At least one of the electrically conductive connections is connected to a control unit, or to a measuring device, in order to detect a leakage current or ground current as a temperature-dependent current flow through the dielectric insulation layer. This is also known per se from the aforementioned prior art. This control unit comprises a controller, or a microcontroller, which comprises at least one AD input. Measuring means are furthermore provided in order to measure a supply voltage of the heating device. The supply voltage is the voltage to which the heating device is connected or with which the at least one heating element is operated. It is generally the so-called mains voltage, although this need not necessarily be the case. The measuring means may comprise at least one resistor or a resistor network as a voltage divider, as will be explained in more detail below. The measuring means are furthermore connected to the AD input of the controller, so that the controller receives the information about the precise level of the supply voltage.

It is therefore possible that not only the temperature-dependent leakage current, from which a temperature at the heating device or at the fluid chamber may be determined, is detected in the control unit, or in the controller. This per se is in fact known from the prior art mentioned in the introduction. In the scope of the invention, however, it has been found that variations in the supply voltage may have very disruptive effects on the heating device, since the leakage voltage dropping across the insulation layer, corresponding to the leakage current, depends directly thereon. Thus the leakage current also depends directly on the supply voltage or varies therewith. In the control unit, problems may then arise when variations in the leakage current are detected, since it is not possible to ascertain whether these originate from variations in the supply voltage or from a temperature change. In this case, for example, it has already been found to be highly disruptive when, in an electrical appliance in which the heating device is installed, other heavy electrical loads are switched on or off. If, for example, the heating device is used as an evaporator in a steam oven which also comprises other electrical heaters with a high power, frequent switching of these heating devices on and off which is provided during operation, for example as intended cycles to maintain a temperature, may lead to variations in the supply voltage and therefore to variations in the leakage current. This can be avoided with the invention if the supply voltage is also measured, since this effect may thereby so to speak be calculated out.

Provision may be made that the measuring means comprise a voltage divider having at least two resistors. This voltage divider may on the one hand be connected to the supply voltage in order to reduce this so that it can be connected directly to the AD input. This represents a very simple possibility of the controller being able to receive the information about the supply voltage.

Advantageously, two AD inputs are provided, specifically one for the voltage supply and another for the leakage current or ground current, or the corresponding voltage. Both values may then be detected at AD inputs of the controller.

Possibly, the voltage divider may also be configured as a voltage divider network, and for example comprise three or even more resistors. In this case, two resistors may be connected in series and one resistor may be connected in parallel therewith. Widely known possibilities which the person skilled in the art knows may be used for this.

In a first advantageous configuration of the invention, the fluid chamber is configured as a tube, which may be arranged vertically or horizontally. It may also extend obliquely. Advantageously, at least one heating element is arranged on a circumferential wall of the tube, and possibly also a heating element on its lower side.

In another configuration of the invention, the fluid chamber is of arbitrary shape, for example even as a shallow bowl, and comprises a heating element only on its lower side. Then, in respect of temperature monitoring, the intention is above all to detect and avoid there being no longer any water to be evaporated, whereby too great and too rapid a temperature rise could occur with possible damage to the heating device.

In another configuration of the invention according to the first alternative, at least one heating element may be applied on the outer side of the fluid chamber, which comprises a vertical tube, and advantageously two heating elements respectively having a plurality of heating conductors may be applied. These two heating elements may then be driven separately. They are advantageously arranged in separate height sections of the fluid chamber, or of the tube, so that height-dependent differential heating is possible. In this case, a second heating element may be arranged over a first heating element. An aforementioned temperature detection may in this case not only be used to establish local overheatings at one of the heating elements, such as may occur because of calcification. It is also possible to establish whether an excessively high temperature first occurs at the upper second heating element before it occurs at the lower first heating element. This may be interpreted as an indication that fluid, or water, needs to be topped up for the evaporation. By a long-term temperature increase over several minutes or even several hours of operation, large-area calcification may be identified, since the heat generated by the heating element then can no longer be dissipated so well to the fluid in the fluid chamber.

In another configuration of the invention, it can be provided that the heating device comprises a pump with which fluid can be pumped into the fluid chamber. This pump is drivable by the control unit, specifically in an aforementioned case when it is identified that there is an unexpected temperature rise, because there is no longer enough fluid there for the heating and the temperature therefore rises too greatly. As an alternative to such a pump, a more highly positioned fluid tank, having a delivery line to the fluid chamber with a valve therein, which is correspondingly driven by the control unit in order to introduce more fluid into the fluid chamber, may be provided.

One possibility of the method according to the invention is thus to introduce fluid into the fluid chamber, or to hold it in a sufficient amount in the fluid chamber. This may be done statically or alternatively while flowing through. At least one of the heating elements is then switched on in order to heat the fluid chamber and the fluid. Advantageously, all the heating elements of the heating device may be switched on. The leakage current is detected as a temperature-dependent current flow through the dielectric insulation layer. This may in principle be done in any desired way, but advantageously by means of a resistor as a leakage voltage, since this can be delivered more easily to an AD connection of the controller mentioned in the introduction. Lastly, the supply voltage of the heating device is measured and this measured supply voltage is taken into account in the evaluation of the temperature, which depends on the leakage current. An influence of variations in this supply voltage may therefore be reduced or even eliminated as far as possible.

Advantageously, a normalized leakage signal may be calculated in the control unit, or in a controller of the control unit, on the basis of the measured supply voltage and the detected leakage current. In this way, for example, topping up of the fluid chamber with fluid may be influenced. Driving of the heating elements may likewise be taken into account, in particular with a power reduction or at least partial switching off.

A temperature may be monitored by evaluating the leakage current in respect of its absolute level and/or its slope. It may therefore be evaluated so to speak in terms of short-term as well as long-term profile. This is also known per se from the prior art mentioned in the introduction.

In an advantageous configuration of the invention, it is possible for the leakage current to be converted into a leakage voltage by means of a resistor. This leakage voltage may be delivered directly to an AD input of the control for further processing. In the control unit, or in the controller with the AD input, the converted leakage voltage is divided by the measured supply voltage, which may likewise be delivered to the controller in the manner mentioned above. The quotient obtained may advantageously subsequently be multiplied by a compensation value in order to obtain a normalized leakage signal, although this need not necessarily be part of the invention. It is then normalized to a base value of the supply voltage. The compensation value may, for example be 230 in the case of a basic supply voltage of 230 V. The aforementioned quotient, or the normalized leakage signal, are then used, if a particular absolute value of the leakage signal is exceeded or if a particular slope of the profile of the leakage signal is exceeded, in order to top up the fluid chamber with more fluid, or water, and/or to reduce the heating power of the heating elements and/or to identify a degree of calcification in the fluid chamber. The calculation process may therefore be carried out easily with reduced outlay.

In one possibility of the invention, in the event that the normalized leakage signal exceeds a first limit value as an indication of an excessively high temperature, the fluid chamber may be topped up with more fluid. This topping up may then be stopped when the normalized leakage current has returned below the first limit value. Because of the topped-up fluid, the temperature has then returned below the limit value corresponding to a particular critical temperature.

In a similar way, in the event that the slope of the profile of the normalized leakage signal exceeds a second limit value, this may be interpreted as an indication of an excessive temperature rise. The fluid chamber is then likewise topped up with more fluid. Here again, the topping up is stopped when the slope of the profile of the normalized leakage signal has returned below the second limit value. Thus, topping up of water may be controlled well in an evaporator as a heating device corresponding to US 2017/0086257 A1.

These and other features are disclosed by the claims as well as by the description and the drawings; the individual features may be implemented individually or jointly in the form of subcombinations in an embodiment of the invention and in other fields, and may represent advantageous and per se protectable embodiments for which protection is claimed here. The subdivision of the application into individual sections and subheadings does not restrict the statements made therein in their general applicability.

BRIEF DESCRIPTION OF THE DRAWINGS

Exemplary embodiments of the invention are schematically represented in the drawings and will be explained in more detail below. In the drawings:

FIG. 2 shows a second embodiment of a heating device according to the invention having two heating elements in a lateral representation, FIG. 3 shows a plan view of the heating device of FIG. 2.

DETAILED DESCRIPTION

Figure 1:
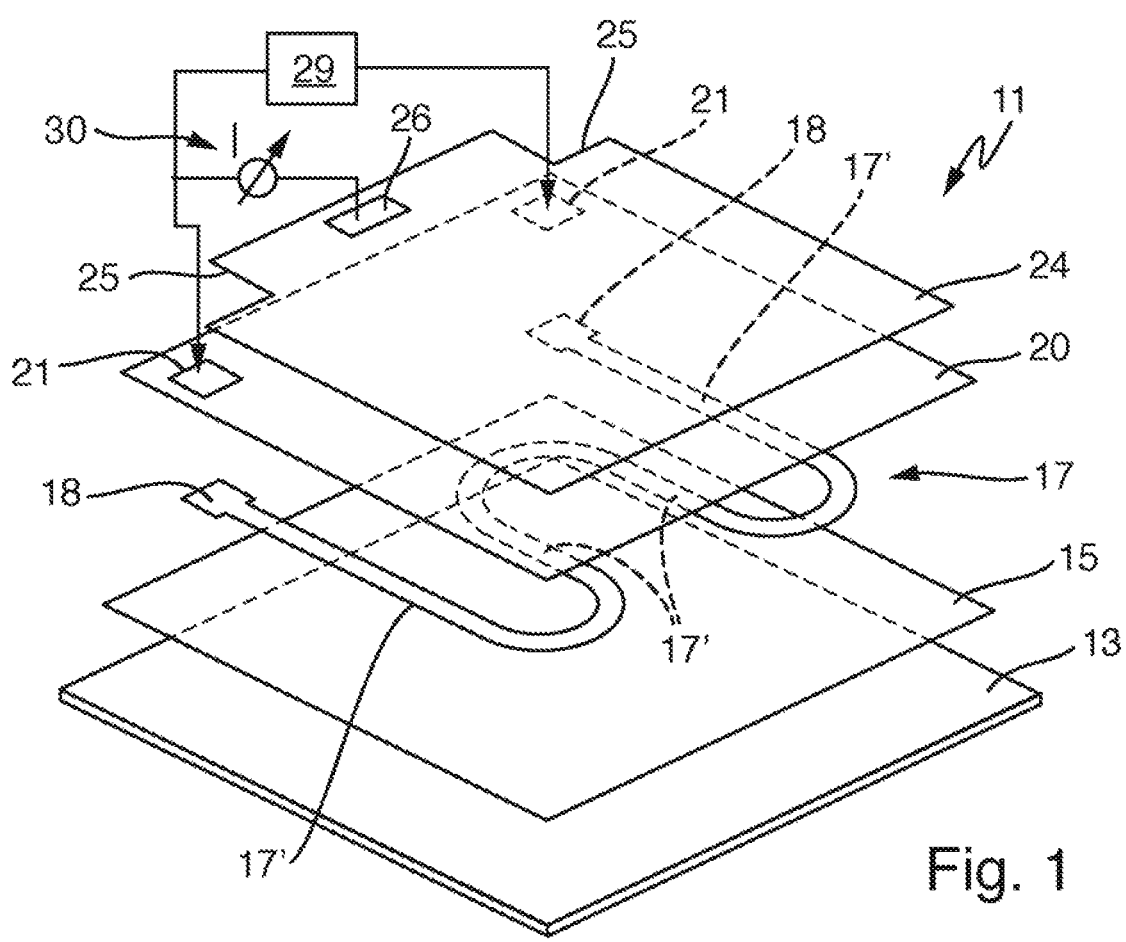
FIG. 1 shows a first embodiment of a heating device according to the invention having a single heating element with a layer structure in an exploded representation.

FIG. 1 represents a first embodiment of a heating device 11 according to the invention in an exploded representation with an oblique view, which shows its layer structure. This corresponds to that of the aforementioned DE 102013200277 A1. The heating device 11 comprises a carrier 13, which in this case consists of metal, or stainless steel. It may be flat or planar, as represented here, alternatively it may also be tubular, as is known from the aforementioned DE 102010043727 A1, see also FIG. 4. On its lower side, or fluid side, there is water to be heated, or water to be heated as a fluid flows past. Provided on the carrier 13, there is an insulation layer 15, which may consist of glass or glass ceramic, as base insulation of the carrier 13. This must be electrically insulating, even at high temperatures. Such a material is fundamentally known to the person skilled in the art for insulation layers.

A single heating element 17 with a meandering profile which consists of individual heating conductors 17' connected successively, or in series, is applied on the first insulation layer 15. These are substantially straight and connected by curved sections. It could, however, also be possible to provide a single heating conductor which is also significantly wider than the narrow heating conductors 17' represented here, in this regard see also FIG. 2. The heating element 17 is configured as a thick-film heating element made of conventional material and is applied by a conventional method. At its two ends, there are enlarged zones as heating conductor contacts 18, which may possibly also consist of a different material, for example a contact material which is conventional for thick-film heating conductors with significantly better electrical conductivity, and above all better contacting properties.

Over the heating element 17, a dielectric insulation layer 20, which may be vitreous or a glass layer, is applied over a large area. The dielectric insulation layer 20 so to speak seals the heating device 11, or insulates the heating element 17 and seals it as well as the layer structure, in particular against harmful or aggressive environmental influences. For electrical contacting onto the heating element 17, or its heating conductor contacts 18, the dielectric insulation layer 20 comprises windows 21 precisely over the heating conductor contacts 18 for through-contacting which is known per se.

An electrode 24 is applied as an electrically conductive connection, specifically in the form of a large-area layer, on the dielectric insulation layer 20. Here, this is precisely as large as the carrier 13 and the insulation layer 15. The electrode 24 should not directly overlap onto the carrier 13 or the heating element 17, since it must be insulated from the carrier 13 and the heating element 17. On the electrode 24, there may be a further cover, or insulation layer, although there does not have to be. At the corners, this comprises two cutouts 25, which together with the underlying windows 21 in the dielectric insulation layer 20 allow above-described contacting onto the heating conductor contacts 18. The heating element 17, or its heating conductors 17', form the other, or first, connection surface.

A control unit 29 with power supply for the heating element 17 is also represented. A measuring device 30 is furthermore represented, which is connected on the one hand to the electrode 24 by means of an electrode contact 26 and on the other hand to the heating element 17. As explained above, the dielectric, or resistive, properties of the dielectric insulation layer 20 change with the temperature, and the leakage current or ground current detected by the measuring device 30 changes correspondingly, i.e. it increases with an increase in temperature. The measuring device then detects this change of the properties of the dielectric insulation layer 20 between the heating element 17 and the electrode 24.

FIG. 2 shows a second embodiment of a heating device 111 according to the invention with a layer structure in a very simplified lateral representation. A carrier 112, which may optionally form a container as a fluid chamber, for example a tube, comprises at the bottom a fluid side 113 as a lower side, at which water 5 as a fluid flows along or is present. This water 5 is intended to be heated by the heating device 111. On the upper side of the carrier 112, a base insulation 115 is provided as an insulating layer. A heating element 117 is in turn applied thereon, in this case as an extensive heating element, or in thick-film technology. A dielectric insulation layer 119 is applied on the heating element 117, specifically in a different extensive configuration, as explained above and shown with the aid of FIG. 3. On the dielectric insulation layer 119, an electrode surface 121 is in turn applied as an upper connection on the dielectric insulation layer 119 made of electrically conductive material. Its extensive configuration may also be variable. The heating element 117 is in this case also used as a lower connection to the dielectric insulation layer 119, as explained above.

On the medium side 113, there is the danger of calcification of the heating device 111 with the aforementioned risks of excessively raising the temperature and damage or even destruction of individual heating elements 117 or of the heating device 111. For this reason, precisely with the high power densities mentioned here, care is to be taken that this does not happen.

A control unit and a measuring device, which is not represented here but will be explained below, are connected to the heating device 111, in a way corresponding to FIG. 1 or DE 102013200277 A1.

Figure 4:
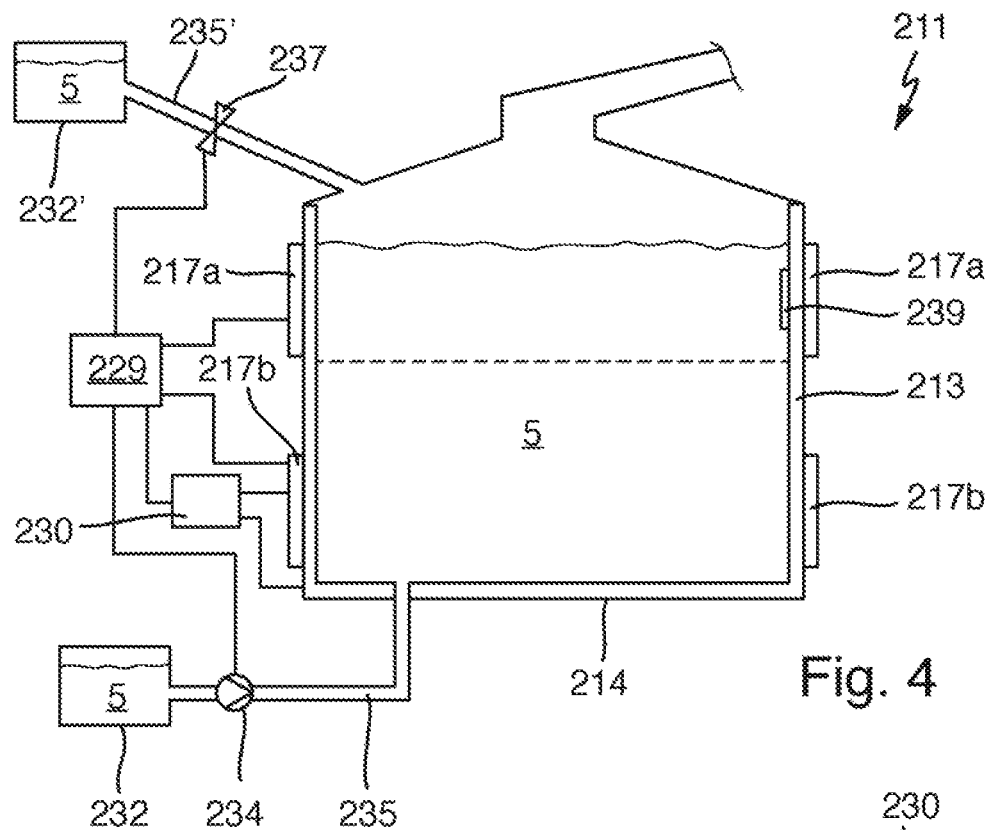
FIG. 4 shows a third embodiment of a heating device according to the invention as a vertical tube with two heating elements.

The plan view in FIG. 3 represents the heating device 111, which may be either flat or a short tube, so that FIG. 3 in this case shows the carrier rolled out, see also FIG. 4. Two heating elements are applied on the carrier 112, namely a first heating element 117a and a second heating element 117b. The heating element 117a forms a partial heating circuit and the heating element 117b forms a partial heating circuit. The two heating elements 117a and 117b are interdigitated, or extend in a meandering shape in one another, so that they ultimately heat the same area of the carrier 112 when they are operated individually, and in any case in common operation. In this way, so to speak, differential distribution of the heating power of the heating device 111 per se is possible.

The two heating elements 117a and 117b have the same length and respectively four longitudinal sections. The two heating elements 117a and 117b also comprise interruptions by way of contact bridges on two longitudinal sections lying next to one another in a known manner. The heating power can thus be somewhat lowered locally. Electrical contacting of the heating elements 117a and 117b is carried out by means of the individual contact zones 118a and 118b as well as a common contact zone 118'. Also schematically visible is a plug-in connection 122, which is applied onto the contact zones 118, or onto the carrier 112, advantageously according to EP 1152639 A2.

A single extensive dielectric insulation layer 119 made of a suitable material, represented here by cross-hatching, is applied onto the heating elements 117a and 117b. It fully covers the two heating elements 117a and 117b and extends as far as or just short of the edge of the carrier 112.

An electrode surface 121 as an electrically conductive connection is in turn applied onto the dielectric insulation layer 119, specifically here as a surface-wide electrode. Although separate temperature detection or detection of calcification is therefore not possible with discrimination into different areas, a simple structure is ensured. Discrimination according to area is in fact carried out by the above-described separate individual operation of the heating elements 117a and 117b. The electrode surface 121 is electrically contacted in a manner not represented here, advantageously by means of the plug-in connection 122.

FIG. 4 represents a third embodiment of a heating device 211 according to the invention, which is configured as an evaporator. For water 5 to be evaporated, it comprises a short vertical tube 213 corresponding to the fluid chamber, which has a circular cross section. Its diameter is greater than its height, although it may also vary significantly. At the top on the outer side of the tube 213, or its circumferential side, a first heating element 217a is arranged all around, or substantially all around. Arranged underneath, there is a second correspondingly identically configured heating element 217b. The heating elements 217a and 217b may comprise a plurality of heating conductors similarly as in FIG. 3 with a horizontal parallel profile. The heating elements 217a and 217b are provided with a layer structure corresponding to FIG. 2, or are externally applied onto the tube 213. The dielectric insulation layer and electrically conductive connections are not represented. The heating elements 217a and 217b are connected to a control unit 229. The dielectric insulation layers (not represented) are connected to a measuring device 230, which is in turn connected to the control unit 229. The control unit 229 may comprise a controller, or consists essentially thereof, at least as regards the intelligent control functions. Above all, the control unit 229 also controls the operation of the heating elements 217a and 217b, possibly also independently of one another. In this regard, in respect of the structure, reference is made to EP 3278691 A1. Water 5 in the tube 213 is heated and evaporated by means of the heating elements 217a and 217b, so that the steam can emerge from the heating device 211 at the top. In this case, as has been described there, the temperature monitoring is of great importance, to which end the invention also plays a role especially in this case because of the increased accuracy achieved.

On the inner side of the tube 213, at the top right, relatively small calcification 239 is represented in a simplified way. It has the effect that, in this region, the heating element 217a cannot dissipate its heat sufficiently well to the water 5 in the tube 213, so that overheating as mentioned in the introduction, or a so-called hot spot, may occur here. This may be identified particularly well by the detection of the temperature according to the invention.

In the heating device 211 according to FIG. 4, two possibilities for topping up with water 5 are implemented. Provided at the bottom left, there is a water tank 232 with a pump 234 driven by the control unit 239 in order to top up the heating device 211, or the fluid chamber of the tube 213, with water 5 from the water tank 232. This is done primarily when it has been established that the water level in the tube 213 has been significantly reduced. This is represented by the dashed line below the upper heating element 217a. At the latest, this upper heating element 217a is greatly overheated and water must be topped up for optimal functioning of the evaporation and, above all, in order to prevent damage by overheating. The control unit 229 carries out this topping up of water by means of the pump 234 whenever it has identified the rising temperature.

As an alternative, a further water tank 232' with water 5 therein is represented at the top left on the heating device 211. It is arranged above the tube 213, so that water can flow automatically into the tube 213, or the fluid chamber, through a delivery line 235'. In this case, the control unit 229 may correspondingly open a valve 237 in the delivery line 235'.

Figure 5:
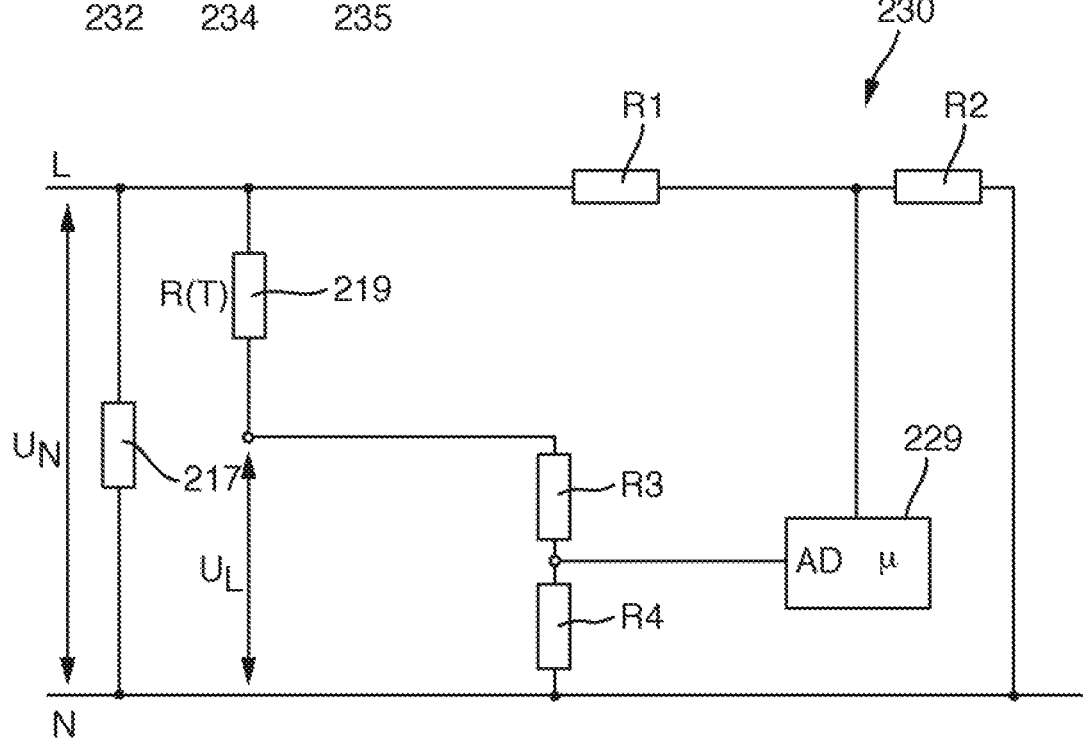
FIG. 5 shows a simplified representation of the structure of the measuring device with voltage dividers consisting of resistors.

FIG. 5 represents in detail the measuring device 230, which is in turn connected to the control unit 229, or to the corresponding controller. The voltage $U_N$ is the mains voltage and is applied to a single heating element 217 which is represented here. If there were a plurality of heating elements, it is likely that they would be applied in parallel with one another to the mains voltage $U_N$. The dielectric insulation layer is furthermore represented by the temperature-dependent resistance $R(T)$ 219. The leakage voltage $U_L$ is applied here relative to ground N, since in this case a corresponding leakage current flows away through the dielectric insulation layer. In order to detect this leakage voltage, the two resistors R3 and R4 are provided as a voltage divider in the measuring device 230. The center tap is applied directly to an AD input AD of the controller. This has in fact already been explained in the introduction.

A further voltage divider consisting of the resistors R1 and R2 is provided in order to tap the mains voltage $U_N$ at the phase L and likewise deliver it to an input of the controller of the control unit 229. Of course, it is in this case readily conceivable that the voltage dividers or a voltage divider network or resistor network thereby formed may also be configured differently.

In the control unit 229, the above-described calculation is then carried out with the aid of the voltage signals read in. In particular, the leakage voltage $U_L$ is divided by the measured mains voltage $U_N$, and this quotient is then advantageously multiplied by a compensation value. The latter is to this end selected as 230 since the heating device 211 is intended to be operated with a mains voltage $U_N$ of 230 V. A normalized leakage signal is thus obtained. The latter may then be evaluated in relation to its absolute value or in relation to its slope, i.e. the first derivative of the profile. This will be explained below with FIGS. 6 and 7. Depending on which of the known overtemperature cases is identified therefrom, the fluid chamber may be topped up with water 5 or the heating power of one of the heating elements 217, or of all the heating elements, may be reduced or switched off.

Figure 6:
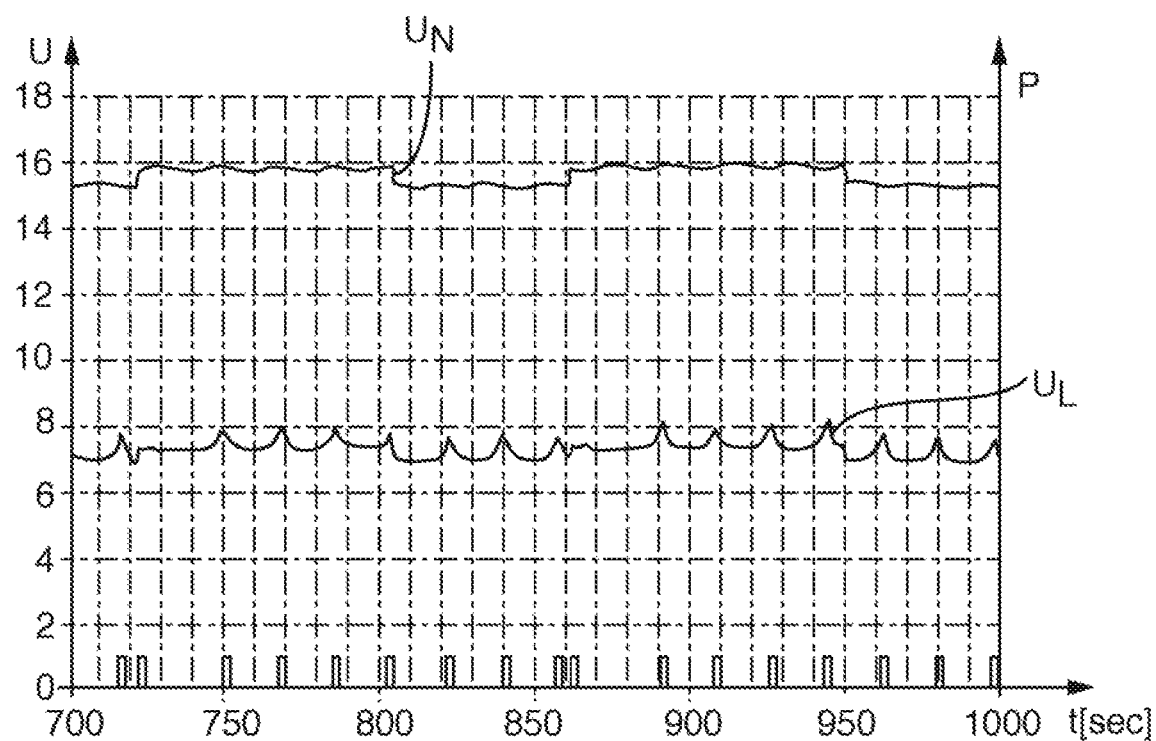
FIG. 6 shows a diagram with profiles of the mains voltage, the leakage voltage and of the operation of the pump of FIG. 4 without the invention.

FIG. 6 represents as a function of time t the way in which the mains voltage $U_N$ and the leakage voltage $U_L$ dependent thereon behave. The invention is not yet implemented in this case. At the very bottom, there is a representation corresponding to the right vertical axis of the activity state of the pump 234 corresponding to FIG. 4, i.e. whether water needs to be pumped in again.

In fact, the operation of the evaporator with the heating device 211 is such that pumping is briefly carried out about every 28 sec in order to top up water. This is shown in the interval between 750 sec and 850 sec as well as beyond 890 sec. Yet since jumps occur in the mains voltage $U_N$, particularly when, the heating device being arranged in an evaporator inside an oven, a further powerful heating device of the oven is switched on or off as a load, the jumps very much not being negligible, a fault occurs. These jumps occur upward here at about 720 sec and about 860 sec. At about 805 sec and 950 sec, the jumps occur downward. This depends precisely on the switching of the further load on and off. It has been found that the pump 234 starts after the jumps of the mains voltage $U_N$ upward, specifically at a time of somewhat more than 720 sec and somewhat more than 860 sec. Thus, pumping takes place too early here. This has the disadvantage above all that more fluid is in the heating device than is actually necessary or intended, so that more water needs to be heated and the evaporation may be somewhat impaired. It can also be seen that the relatively regular pattern of the leakage voltage $U_L$ is interrupted precisely at these jumps. This leads precisely to undesired pumping without this actually being necessary.

Figure 7:
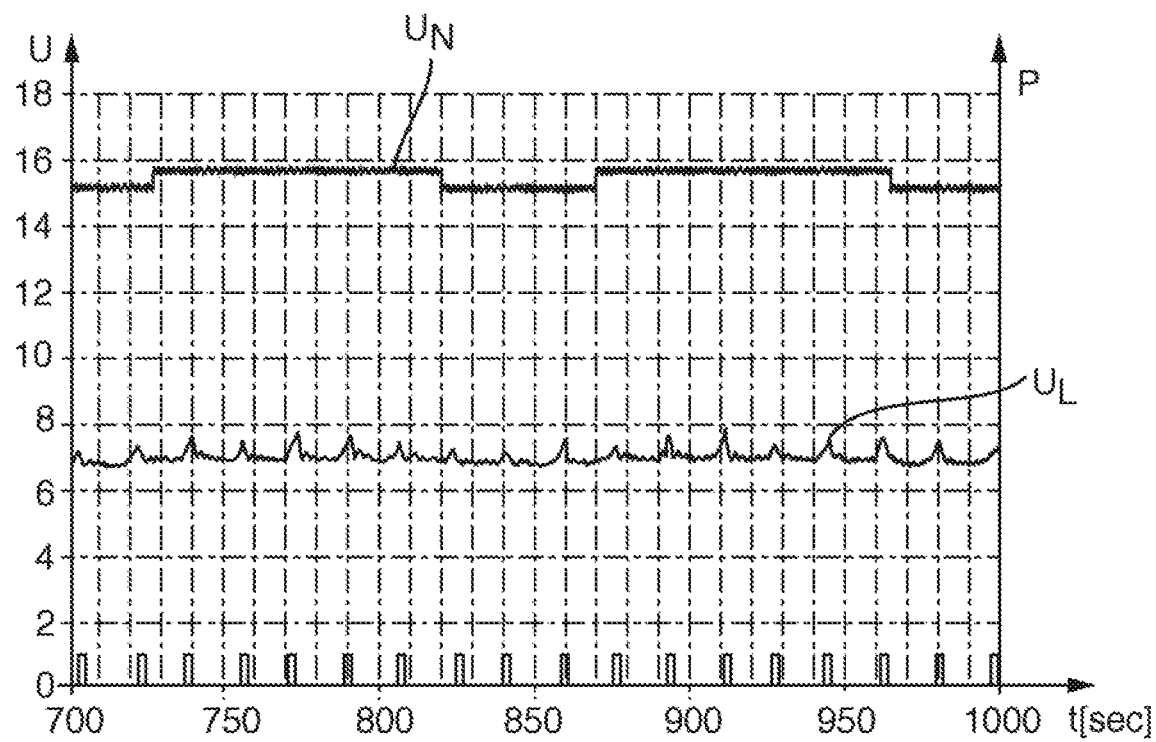
FIG. 7 shows the diagram with profiles of the mains voltage, the leakage voltage and of the operation of the pump corresponding to FIG. 6 with the invention.

In FIG. 7, the compensation or calculation according to the invention has now been carried out. The mains voltage $U_N$ again varies, but at somewhat different times. It has, however, now been found that, by way of the detection and way of consideration, this fluctuation of the mains voltage $U_N$ at the heating device, which does indeed influence the leakage voltage $U_L$, can be compensated for in such a way that pumping at the pump 234 takes place at the desired regular intervals. Above all, this is also exhibited in the regularity of the profile of the leakage voltage $U_L$. When the jumps occur in the mains voltage $U_N$, the leakage voltage $U_L$ does not change. Better temperature detection is therefore possible, and the heating device 211 can therefore also be operated better.

This effect is readily conceivably likewise advantageous in the detection of, for example, a hot spot or local overheating because of calcification 239 corresponding to FIG. 4. The leakage voltage $U_L$ increases because of this overheating, since an increased leakage current flows in this region. A sudden rise in the mains voltage $U_N$ with which the heating element is operated, and therefore necessarily also a corresponding jump in the leakage voltage, can be compensated for.

The same applies for large-area calcification, which causes an overall slow rise in the leakage voltage because of slowly increasing temperature.

The invention claimed is:

1. Heating device for fluids, said heating device comprising a fluid chamber, wherein:
   at least one heating element is provided and is applied on an outer side of said fluid chamber, said heating element having at least one heating conductor,
   said heating device comprises at least one extensive dielectric insulation layer, said extensive dielectric insulation layer essentially covering said heating element,
   said extensive dielectric insulation layer has a temperature-dependent electrical resistance,
   at least one electrically conductive connection is respectively provided on both sides of said extensive dielectric insulation layer,
   at least one of said electrically conductive connections is connected to a control unit or a measuring device of said heating device in order to detect a leakage current as a temperature-dependent current flow through said extensive dielectric insulation layer,
   said control unit of said heating device comprises a controller or microcontroller, said controller or microcontroller comprising an AD input,
   measuring means are provided in order to measure a supply voltage of said heating device, said measuring means being connected to said AD input, and
   wherein said control unit is programmed to take into account said measured supply voltage in an evaluation of the temperature.

2. The heating device according to claim 1, wherein said measuring means comprise a voltage divider having at least two resistors, said voltage divider being connected to said supply voltage in order to reduce said supply voltage for connection to said AD input.

3. The heating device according to claim 2, wherein said voltage divider is configured as a voltage divider network having three resistors, two said resistors being connected in series and one said resistor being connected in parallel with said two resistors being connected in series.

4. The heating device according to claim 1, wherein said fluid chamber comprises a tube.

5. The heating device according to claim 4, wherein said at least one heating element is applied on a circumferential outer side of said tube.

6. The heating device according to claim 5, wherein a bottom of said tube is configured as a connection of said fluid chamber downward without heating.

7. The heating device according to claim 1, wherein said fluid chamber comprises a flat bottom, said at least one heating element being applied on a lower side of said flat bottom.

8. The heating device according to claim 1, wherein at least two of said heating elements, each having a plurality of said heating conductors, are applied on said outer side of said fluid chamber, said two heating elements being separately drivable.

9. The heating device according to claim 8, wherein said two heating elements are separately drivable and are arranged in separate height sections of said fluid chamber, or of a tube.

10. The heating device according to claim 1, wherein said heating device comprises a pump in order to pump water into said fluid chamber, said pump being drivable by said control unit of said heating device.

11. The heating device according to claim 1, wherein said heating device comprises a fluid tank positioned above said fluid chamber, said fluid tank having a delivery line to said fluid chamber with a valve therein, said valve being correspondingly drivable by said control unit in order to introduce more fluid into said fluid chamber, and said heating device comprises a pump in order to pump water into said fluid chamber, said pump being drivable by said control unit of said heating device.

12. The heating device according to claim 1, wherein a steam outlet is provided above said fluid chamber, said fluid chamber being a water chamber.

13. The heating device according to claim 1, wherein said electrically conductive connection is an electrically conductive connection surface.

14. The heating device according to claim 1, wherein said electrically conductive connection is respectively provided on both said sides of said extensive dielectric insulation layer with identical coverage.

15. The heating device according to claim 5, wherein said tube is vertical with a height greater than a diameter of said tube.

16. Method for operating the heating device according to claim 1, said method comprising the following steps:
   introducing fluid into said fluid chamber,
   switching on one of said heating elements,
   detecting said leakage current as a temperature-dependent current flow through said extensive dielectric insulation layer,
   measuring said supply voltage of said heating device, and
   taking said measured supply voltage into account in an evaluation of said temperature at said fluid chamber as a function of said leakage current.

17. The method according to claim 16, wherein all said heating elements of said heating device are switched on at a start of operation of said heating device.

18. The method according to claim 16, wherein a leakage signal is calculated in said control unit on a basis of said measured supply voltage and said detected leakage current, wherein with said leakage signal said fluid chamber is topped up with fluid or driving of said heating elements is influenced.

19. The method according to claim 16, wherein a monitoring of a temperature at said extensive dielectric insulation layer is provided by evaluating said leakage current in respect of absolute level or in respect of slope.

20. The method according to claim 16, wherein
   the method further comprises converting said leakage current into a leakage voltage by means of a resistor,
   said converted leakage voltage is divided by said measured supply voltage,
   a quotient obtained is subsequently multiplied by a compensation value in order to obtain a normalized leakage signal, said normalized leakage signal being normalized to a base value of said supply voltage, and
   said normalized leakage signal is used, if a particular absolute value of said leakage signal is exceeded or if a particular slope of a profile of said leakage signal is exceeded, in order to top up said fluid chamber with more fluid or to reduce heating power of at least one said heating element or to identify a degree of calcification on a wall of said fluid chamber.

21. The method according to claim 20, wherein, in an event that said normalized leakage signal exceeds a first limit value as an indication of an excessively high temperature, said fluid chamber being topped up with more of said fluid and said topping up is stopped when said normalized leakage signal has returned below said first limit value.

22. The method according to claim 20, wherein, in an event that said slope of said profile of said normalized leakage signal exceeds a second limit value as an indication of an excessive temperature rise, said fluid chamber is topped up with more fluid and said topping up is stopped when said slope of said profile of said normalized leakage signal has returned below said second limit value.

* * * * *